United States Patent Office 2,963,506
Patented Dec. 6, 1960

2,963,506

PROCESS FOR PREPARING ACID ESTERS OF POLYPHOSPHORIC ACIDS AND THEIR SALTS

Horst Lewinski, Burgkirchen, Upper Bavaria, Germany, assignor to Farbwerke Hoechst Aktiengesellschaft vormals Meister Lucius & Bruning, Frankfurt am Main, Germany, a corporation of Germany No Drawing. Filed Aug. 19, 1958, Ser. No. 755,882

Claims priority, application Germany Aug. 22, 1957

6 Claims. (Cl. 260—461)

Whereas numerous processes are known for preparing tetra-alkyl esters of pyrophosphoric acid, no useful references are available which teach the preparation of acid esters. In some cases in which their preparation is mentioned, the acid esters of pyrophosphoric acid are obtained by heating the components to 50–90° C. By means of the acid number, it can be ascertained whether the reaction products are acid esters of pyrophosphoric acid or only mixtures of the components whose acid number is superior to that of the ester.

Corresponding experiments showed that esterification is not achieved by heating one mol of fat alcohol and 1 mol of pyrophosphoric acid to 50° C. In additional tests, 2 mols of fat alcohol and 1 mol of pyrophosphoric acid were used each time. When the reaction temperature is raised to 90–110° C., an esterification up to 40% at the maximum takes place. Even when operating at a reaction temperature of 130° C. or when working under reduced pressure or by blowing nitrogen through the reaction mixture, it is not possible to arrive at a degree of esterification exceeding 65%. When the temperature of reaction is raised, for instance to about 145° C., intramolecular and intermolecular dehydration of the fat alcohol take place which are caused by the catalytic influence of the pyrophosphoric acid, and the reaction product is separated into 2 layers. Upon distilling of the upper layer—the lower layer consists of pyrophosphoric acid or orthophosphoric acid—there is obtained as the main product the olefin corresponding to the alcohol used whereas the corresponding dialkyl ether is obtained as by-product in a small yield.

Now, I have found that acid esters of polyphosphoric acids can be obtained in a yield of 100% and in an economical way by means of industrial processes which are carried out in a simple manner by heating high-molecular aliphatic primary alcohols containing at least 8 carbon atoms with polyphosphoric acids in the presence of water-soluble inorganic salts binding crystal water, for instance anhydrous sodium sulfate, calcium chloride, magnesium sulfate, magnesium chloride, aluminum sulfate, zinc chloride and the like. By adding these substances, any water formed during the esterification is forthwith withdrawn from the equilibrium of reaction and the latter is displaced thereby in the sense of a complete esterification; on the other hand a possible hydrolysis of the polyphosphoric acids is inhibited. About 0.1–1 mole of inorganic salts binding crystal water are used by 1 mol of alcohol, preferably 0.5 mol/1 mol of alcohol. The temperature of reaction is chosen between about 100° C. and about 140° C., preferably 130° C. When the reaction is finished, inorganic salts binding crystal water are decanted or filtered off and the acid ester is neutralized, if desired, by means of sodium hydroxide solution of 50% strength. After dehydration, the salts binding water can be reintroduced again.

As high molecular alcohols, there may be used such aliphatic alcohols as contain in the molecule at least 8 carbon atoms in straight or branched chain, such as octanol, 2-ethyl-hexanol, decanol, dodecanol, octadecanol, hexyl-dodecanol, as well as mixtures of alcohols as obtained by hydrogenation of vegetable and animal fats and oils.

As polyphosphoric acids, there may be used: pyrophosphoric acid, triphosphoric acid, tetraphosphoric acid, as well as phosphoric acids of still higher condensation and their mixtures.

The acid esters of polyphosphoric acid and particularly their salts are appreciated emulsifiers and can be used for various purposes for instance as additions to textile auxiliary agents or to crude material for detergents, in the preparation of high polymers according to the emulsion process.

The following examples serve to illustrate the invention but they are not intended to limit it thereto; the parts being by weight:

Example 1

180 parts of pyrophosphoric acid are added at about 100° C. with intensive stirring to 540 parts of wax alcohol and 140 parts of anhydrous sodium sulfate. The whole is heated for about half an hour to 130° C., whereby the primarily suspended sodium sulfate balls together at the bottom of the reaction vessel. It is allowed to deposit and it is then decanted or filtered. The reaction product i.e. the secondary ester of pyrophosphoric acid, has an acid number of 164, while the original mixture had an acid number of 312. Yield: 675 parts=98.8% of the theoretical yield.

By stirring in the calculated amount of sodium hydroxide solution of 50% strength at 70° C. the acid ester is neutralized. On cooling the product solidifies to a weakly yellow, waxlike mass.

Example 2

90 parts of pyrophosphoric acid are added at about 100° C. while stirring to 200 parts of coconut oil alcohol and 50 parts of anhydrous sodium sulfate and the mass is heated for 1 hour to 135° C. The secondary pyrophosphoric acid ester of the coconut oil alcohol that has been formed has an acid number of 207. For the mixture an acid number of 388 is calculated. Yield 268 parts= 98.5% of the theory.

Example 3

270 parts of octadecanol are mixed with 110 parts of calcium chloride and heated to about 90° C. Upon addition of 90 parts of pyrophosphoric acid the temperature is raised for 3 hours to 120° C. In a still hot condition the secondary ester of the octadecanol is separated from the calcium chloride by filtration. The acid numbers are the same as indicated in Example 1. The yield amounts to 335 parts =98% of the theory.

Example 4

90 parts of pyrophosphoric acid are added at 100° C. to 158 parts of 2-ethyl-hexanol and 70 parts of anhydrous sodium sulfate, and the whole is heated for 2 hours to 130° C. After filtration the product is neutralized by means of sodium hydroxide solution of 50% strength. The acid ester has an acid number of 245. Yield: 196 parts=97% of the theory.

Example 5

130 parts of a mixture of various polyphosphoric acids of an average molecular weight of 260 are added at about 120° C. to 270 parts of wax alcohol and 140 parts of anhydrous sodium sulfate. After an hour's heating to 125° C. the mixture is filtered and the acid ester of polyphosphoric acid that has been formed is neutralized by means of sodium hydroxide solution of 50° strength. The acid ester has an acid number of 221, whereas the mixture of the components shows an acid number of 351. The yield amounts to 374 parts=97.9% of the theory.

Obviously many modifications and variations of the present invention are possible in the light of the above teachings. It is, therefore, to be understood that within the scope of the appended claims the invention may be practiced otherwise than as specifically described.

We claim:

1. A process for preparing esters which comprises reacting a saturated primary aliphatic alcohol selected from the group consisting of straight or branched chain alcohols having 8 to 22 carbon atoms with a liquid of acid reaction and containing at least one acid selected from the group consisting of pyrophosphoric acid, triphosphoric acid, tetraphosphoric acid, and their salts in the presence of inorganic salts capable of binding crystal water.

2. A process for preparing esters which comprises reacting a saturated primary aliphatic alcohol selected from the group consisting of straight or branched chain alcohols having 8 to 22 carbon atoms with a liquid of acid reaction and containing at least one acid selected from the group consisting of pyrophosphoric acid, triphosphoric acid, tetraphosphoric acid, and their salts in the presence of inorganic salts capable of binding crystal water, and neutralizing the acid esters.

3. The process as claimed in claim 1, wherein the components are reacted by heating at a temperature above about 100° C.

4. The process as claimed in claim 2, wherein the components are reacted by heating at a temperature above about 100° C.

5. The process as claimed in claim 1, wherein the reaction is carried out at a temperature between about 100° C. and about 140° C.

6. The process as claimed in claim 2, wherein the reaction is carried out at a temperature between about 100° C. and about 140° C.

No references cited.